US011878691B2

United States Patent
Adamczak et al.

(10) Patent No.: US 11,878,691 B2
(45) Date of Patent: Jan. 23, 2024

(54) SYSTEM FOR SUCTIONING BRAKING PARTICLES WITH PREEMPTIVE CONTROL

(71) Applicant: TALLANO TECHNOLOGIE, Boulogne Billancourt (FR)

(72) Inventors: Loïc Adamczak, Boulogne Billancourt (FR); Thibaut Le Boulaire, Boulogne Billancourt (FR)

(73) Assignee: TALLANO TECHNOLOGIES, Paris (FR)

( * ) Notice: Subject to any disclaimer, the term of this patent is extended or adjusted under 35 U.S.C. 154(b) by 429 days.

(21) Appl. No.: 17/291,929

(22) PCT Filed: Nov. 4, 2019

(86) PCT No.: PCT/FR2019/052610
§ 371 (c)(1),
(2) Date: May 6, 2021

(87) PCT Pub. No.: WO2020/094964
PCT Pub. Date: May 14, 2020

(65) Prior Publication Data
US 2022/0003284 A1  Jan. 6, 2022

(30) Foreign Application Priority Data

Nov. 8, 2018  (FR) ..................................... 18 60305

(51) Int. Cl.
*B60W 30/18* (2012.01)
*B60W 10/192* (2012.01)

(52) U.S. Cl.
CPC ..... *B60W 30/18127* (2013.01); *B60W 10/192* (2013.01); *B60W 2540/106* (2013.01); *B60W 2710/18* (2013.01)

(58) Field of Classification Search
CPC ......... B60W 30/18127; B60W 10/192; B60W 2540/106; B60W 2710/18; F16D 65/0031
See application file for complete search history.

(56) References Cited

U.S. PATENT DOCUMENTS

2010/0269683 A1 10/2010 Anderson et al.
2013/0105252 A1* 5/2013 Pahle .................. F16D 65/0031
188/71.1
(Continued)

FOREIGN PATENT DOCUMENTS

DE  42 40 873   6/1994
DE  196 43 869  5/1998
(Continued)

OTHER PUBLICATIONS

Office Action issued in Singaporean Patent Application No. 11202104434Q dated Nov. 21, 2022.
(Continued)

*Primary Examiner* — Ryan Rink
(74) *Attorney, Agent, or Firm* — NIXON & VANDERHYE

(57) ABSTRACT

System for suctioning braking particles from a friction braking system of a vehicle, the suction system including a negative-pressure source, a suction mouth, a filter, a conduit connecting the suction mouth to the negative-pressure source, a control unit configured to control the negative-pressure source, the suction system further including a stream of information originating from a computer that controls a motor-generator of a driving/braking system of the vehicle, the control unit being configured to control the negative-pressure source preemptively before the actual activation of the friction braking, the control unit controlling the negative-pressure source as a function of the activation of electromagnetic braking or other parameters, and associated method.

20 Claims, 3 Drawing Sheets

(56) References Cited

U.S. PATENT DOCUMENTS

| | | | | |
|---|---|---|---|---|
| 2013/0174742 A1* | 7/2013 | Gelb | ................ | B01D 46/521 |
| | | | | 55/467 |
| 2014/0246281 A1 | 9/2014 | Kleickmann et al. | | |
| 2017/0198772 A1 | 7/2017 | Rocca-Serra | | |
| 2020/0049213 A1 | 2/2020 | Rocca-Serra | | |
| 2021/0190156 A1* | 6/2021 | Eichner | ............ | F16D 65/0031 |
| 2021/0239168 A1* | 8/2021 | Adamczak | ......... | B01D 53/0415 |

FOREIGN PATENT DOCUMENTS

| | | |
|---|---|---|
| DE | 10 2011 111 594 | 2/2013 |
| DE | 10 2016 117 778 | 3/2018 |
| FR | 3 057 040 A1 | 4/2018 |
| GB | 2499281 | 9/2013 |
| GB | 2533476 | 6/2016 |
| JP | 2012-081931 | 4/2012 |

OTHER PUBLICATIONS

International Search Report for PCT/FR2019/052610 dated Jan. 24, 2020, 6 pages.
Written Opinion of the ISA for PCT/FR2019/052610 dated Jan. 24, 2020, 5 pages.

* cited by examiner

SYSTEM FOR SUCTIONING BRAKING PARTICLES WITH PREEMPTIVE CONTROL

This application is the U.S. national phase of International Application No. PCT/FR2019/052610 filed Nov. 4, 2019 which designated the U.S. and claims priority to FR Patent Application No. 18 60305 filed Nov. 8, 2018, the entire contents of each of which are hereby incorporated by reference.

TECHNICAL FIELD

The invention relates to systems for suctioning braking particles in friction braking systems. Such friction braking systems can be fitted to road or rail vehicles, without excluding stationary machines such as wind turbines or industrial machines.

BACKGROUND AND PRIOR ART

In such systems, for example as described in document DE4240873, a suction turbine and a particle collection filter are provided. The particles from abrasion are thus gradually accumulated in the collection filter.

The reasonable conventional solution is to activate the suction turbine only when the friction braking is actually activated, by the driver or by a system of the vehicle.

However, the inventors have noticed that the time required to establish the desired negative pressure in the conduit and suction mouth is not negligible and that, as a result, at the very beginning of the braking phase the negative pressure could still be insufficient for capturing the braking particles correctly.

In other words, if the turbine is activated at the moment friction braking begins, the negative pressure can sometimes take too long to establish and the capture rate is not optimal. Furthermore, continuous controlling of the turbine is not desirable either, considering the electrical consumption of the turbine motor and the noise generated by the operation of the turbine.

The object of the present invention is to propose an improved solution relating to capture performance at the very beginning of the friction braking phase.

SUMMARY OF THE INVENTION

To this end, a system for suctioning braking particles from a friction braking system of a vehicle is proposed, in a hybrid or electric vehicle, the suction system comprising:
  at least one negative-pressure source (for example a turbine or other means), at least one suction mouth connected by a pneumatic circuit to the negative-pressure source, and a control unit configured to control the negative-pressure source,
  characterized in that the suction system further comprises a stream of information originating from a computer that controls a motor-generator of a driving/braking system of the vehicle,
  and wherein the control unit is configured to control the negative-pressure source preemptively before the actual activation of the friction braking, the control unit controlling the negative-pressure source at least as a function of the activation of electromagnetic braking.

With these arrangements, in the case of an electric or hybrid vehicle, where generally a phase of electromagnetic braking with energy recovery precedes a phase of dissipative friction braking, the information triggering the electromagnetic braking is advantageously used to initialize the suction phase of the suction system preemptively before the friction braking phase which generally begins later, from several hundred milliseconds to several seconds after the electromagnetic braking begins, depending on the case.

Here, the term "hybrid vehicle" denotes a vehicle comprising a drivetrain with both a combustion engine and an electric motor. In the present document, the term "hybrid vehicle" covers all available solutions which can be termed hybrids, from "micro hybrid" to "full hybrid", according to the level of electric power available and according to the level of autonomy available.

The term "electric vehicle" is to be understood here to mean a vehicle with zero emissions resulting from combustion, in other words without a combustion engine.

The term "suction mouth" is to be understood here to mean a primary particle capture zone, for example a groove formed in the friction material or a slot in the immediate vicinity of at least one edge of the friction material.

The particles originate from a friction material, which is typically part of a brake pad or an equivalent member.

The term "negative-pressure source" is to be understood here to mean either a turbine specific to the function of suctioning braking particles, or a negative-pressure source preexisting in the vehicle and selectively used to suction particles towards a collection filter.

In addition, the system may comprise at least one filter (2) to collect the suctioned particles.

In addition, the pneumatic circuit may comprise at least a first conduit (3) connecting the suction mouth to the filter (2). The first conduit is located downstream of the suction mouth in the particles' path which goes from the suction mouth to the filter.

According to an advantageous arrangement, the filter (2) is interposed between the first conduit (3) and the negative-pressure source (1). The negative-pressure source suctions the particles through the filter which is then at a negative pressure relative to the external ambient pressure.

According to an alternate reverse arrangement, it is the negative-pressure source which is interposed between the first conduit and the filter, in which case the particles are suctioned and then they are blown into the filter (filter at positive pressure).

In various embodiments of the invention relating to the system, use may possibly further be made of one or more of the following arrangements, individually or in combination.

According to a preferred option, the negative-pressure source is formed by a turbine driven by an electric motor. This forms a solution independent of any other pneumatic system of the vehicle; in addition, this solution benefits from great control flexibility, as it is possible in particular to control the turbine to be on or off or at any speed of rotation.

According to an alternative option, the negative-pressure source is formed by a negative-pressure source preexisting in the vehicle, in particular, for the case of the automotive sector, a negative-pressure source induced by the operation of the vehicle's engine, for example a bypass from the air intake, or in another example by the use of a Venturi effect on an outgoing stream of gas, for example exhaust gases. In the case of the railway sector, the negative-pressure source may be derived from the pneumatic braking system or from some other auxiliary system of the railway vehicle.

According to one option, the suction system further comprises a stream of information originating from an electrodynamic braking computer, and the control unit is configured to control the negative-pressure source according to activation of an electrodynamic braking. In this manner, in addition to taking into account the electromagnetic braking, the system can take into account another braking system of the electrodynamic type, for example a retarder (a system frequently found in heavy-duty vehicles).

According to one option, the system comprises a centralized filter and turbine, which are connected to four or more suction mouths. In this manner, the cost of the complete solution is optimized. Even with substantial pipe lengths and a non-negligible internal volume in this configuration, the proposed preemptive control makes it possible to generate negative pressure in the conduits early enough to optimize the capture of particles.

According to one option, the system comprises a decentralized filter and turbine, namely for each suction mouth or pair of suction mouths. In this manner, a distributed system is obtained, and a failure in one part has no impact on the proper operation of the other parts of the system. It is even possible to have a filter, a turbine, and a suction mouth per pad, and/or a suction mouth per side of the disc.

According to one option, the control unit is configured to control the negative-pressure source according to a rapid release of the foot from the accelerator pedal. As a result, the system for suctioning braking particles can be started even before the driver presses the brake pedal to trigger an electromagnetic or electrodynamic braking device, or the system for suctioning braking particles can be started preemptively to anticipate an emergency braking phase in which friction braking must be applied as soon as possible.

According to one option, at least a second conduit connecting the filter to the negative-pressure source is provided. Advantageously, even with long lengths of pipes between the negative-pressure source (the turbine or other) and the suction mouths (with a significant volume of air), the ploy of preemptive anticipation makes it possible to have sufficient negative pressure when friction braking begins.

The invention also relates to a method for controlling a system for suctioning friction braking particles from a braking system of a vehicle, in a hybrid or electric vehicle, the suction system comprising:

at least one negative-pressure source (for example a turbine or other means), at least one suction mouth (83), at least one pneumatic circuit connecting the suction mouth to the negative-pressure source, and a control unit (6) configured to implement the steps of:
receiving one or more items of information from a computer that controls a motor-generator of a driving/braking system of the vehicle,
establishing conditions for preemptive control of the negative-pressure source,
controlling the negative-pressure source according to the preemptive control conditions.

With these arrangements, in the case of an electric or hybrid vehicle, where generally a phase of electromagnetic braking with energy recovery precedes a phase of dissipative friction braking, the information triggering the electromagnetic braking is advantageously used to initialize the suction phase of the suction system preemptively before the friction braking phase which generally begins later, from several hundred milliseconds to several seconds after the start of electromagnetic braking, depending on the case.

In various embodiments of the invention relating to the method, use may further possibly be made of one or more of the following arrangements, individually or in combination.

According to one option, the control unit is further configured to receive one or more items of information from a friction braking control system of the vehicle. Thus, even if the information corresponding to preemptive anticipation is not received, then the suction system is still started up as soon as the information from activation of the friction braking is present or received. For example, in the case of emergency braking, friction braking is applied as soon as possible and the preemptive anticipation information for electromagnetic braking does not arrive before the information for friction braking.

According to one option, the control unit is further configured to take into account a rapid release of the foot from the accelerator pedal. This makes it possible, for example, to anticipate an emergency braking phase in which friction braking must be applied as soon as possible.

According to one option, the control unit is further configured to take into account control signals controlling the fuel injectors of the combustion engine. As a result, a decrease in the control time of the injectors reflects a substantial probability of subsequent braking, and activation of the system for suctioning braking particles can be anticipated.

According to one option, the control unit is further configured to take into account a map containing areas with a high probability of braking, and/or areas of long descent (mountain pass). An additional source of information is thus used to contribute to anticipating the need to suction braking particles.

According to one option, the control unit is further configured to take into account information coming from an environment and hazard recognition system, which can comprise cameras, lidars, in particular those with obstacle detection functionality. This contributes to anticipating the need to suction braking particles.

According to one option, the control unit is further configured to receive information on the current speed of the vehicle, so as to be able to reduce or discontinue the controlling of the turbine in the event that the vehicle is at zero speed. This makes it possible to refine the control logic and avoid unnecessary suction phases, for example when the vehicle is at a red light with the foot on the brake.

According to one option, the control unit is further configured to extend the activation of the suction system by a predetermined time after one of the following events: release of the friction brake or stopping of the vehicle speed (zero speed maintained). This timed extension makes it possible to further optimize the particle capture rate.

The invention also relates to a method for controlling a system for suctioning friction braking particles from a braking system of a vehicle, in a vehicle with a conventional combustion engine, the suction system comprising at least one negative-pressure source, at least one suction mouth (83), at least one pneumatic circuit connecting the suction mouth to the negative-pressure source, and a control unit (6) configured to determine conditions for preemptive control of the negative-pressure source, the conditions for preemptive control comprising one or more of the following conditions: the vehicle's presence in a map region containing areas with a high probability of braking, the vehicle's presence in a long downhill road segment.

The above conditions for preemptive control may further comprise a rapid lifting of the foot from the accelerator pedal, a downward change in the control signals controlling the fuel injectors of the combustion engine.

The above conditions for preemptive control may also include hazard information coming from an environment recognition system, which may comprise cameras, lidars, in particular those with obstacle detection functionality.

The invention also relates to a system for a vehicle with a conventional combustion engine, configured to implement the method described in the preceding paragraphs.

DESCRIPTION OF FIGURES

Other features, aims, and advantages of the invention will be apparent from reading the following description of an embodiment of the invention, given as a non-limiting example. The invention will also be better understood by referring to the accompanying drawings, in which.

DETAILED DESCRIPTION

In the various figures, the same references designate identical or similar elements. For clarity in the presentation, certain elements are not necessarily represented to scale.

Figure 1:
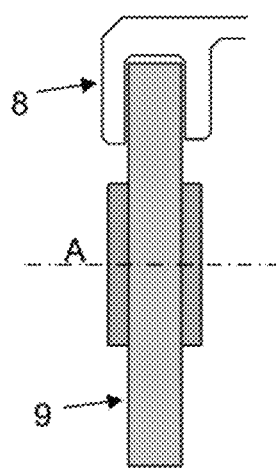
FIG. 1 shows a side view of an example of a friction braking member.

FIG. 1 schematically shows a friction braking member. In the case illustrated, represented is a brake disc 9 intended to be made integral in rotation with a wheel (or an axle for rolling stock). The disc 9 rotates about the axis A. According to the prior art, there is a caliper 7 straddling the disc and mounted on a caliper bracket. In addition, the caliper comprises a piston configured to act on friction pads so as to sandwich the disc. The friction pads or linings (not shown) are mounted on back plates or sole plates, all of this being known per se and not described in detail here.

Although a diagram of a disc brake has been represented, the invention is also suitable for drum brakes, or even systems with brake pads applied directly to the wheel rim.

At the location of the friction pads, a device 8 for capturing escaping particles is provided. More particularly, a suction mouth 83 may be provided for each of the friction pads. An example can be found for example in document FR3057040 of the present Applicant, where the particles are captured in grooves formed in the friction material. The suction mouth may be formed by the groove(s) which in turn are connected to a through-hole in the sole plate of the friction lining and in communication with a passage downstream (towards the filter).

The suction mouth 83 is connected to a negative-pressure source by a pneumatic circuit.

In general, the suction mouth may be in the path of the particles as they exit the interface between the pad and the rotating member (disc, drum, rim, etc.). It is the negative pressure or the flow created at this location that contributes to a good capture.

In other configurations a cowling may be provided, in which case the suction mouth is formed by the outlet from the space covered by said cowling.

It should therefore be understood that the invention can be applied regardless of the configuration of the suction mouth 83.

Typically for a disc brake configuration, there will be a suction mouth 83 on each side of the disc, as shown in FIG. 1.

Figure 2:
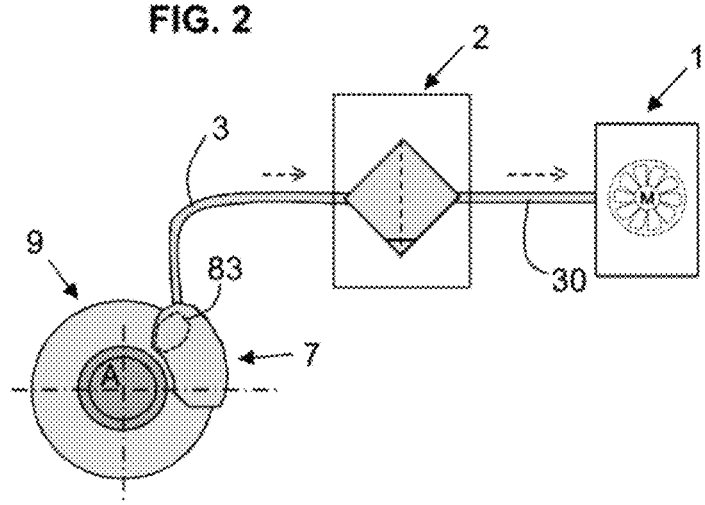
FIG. 2 shows a functional diagram of a localized system for suctioning braking particles, for a wheel or an axle.
Figure 3:
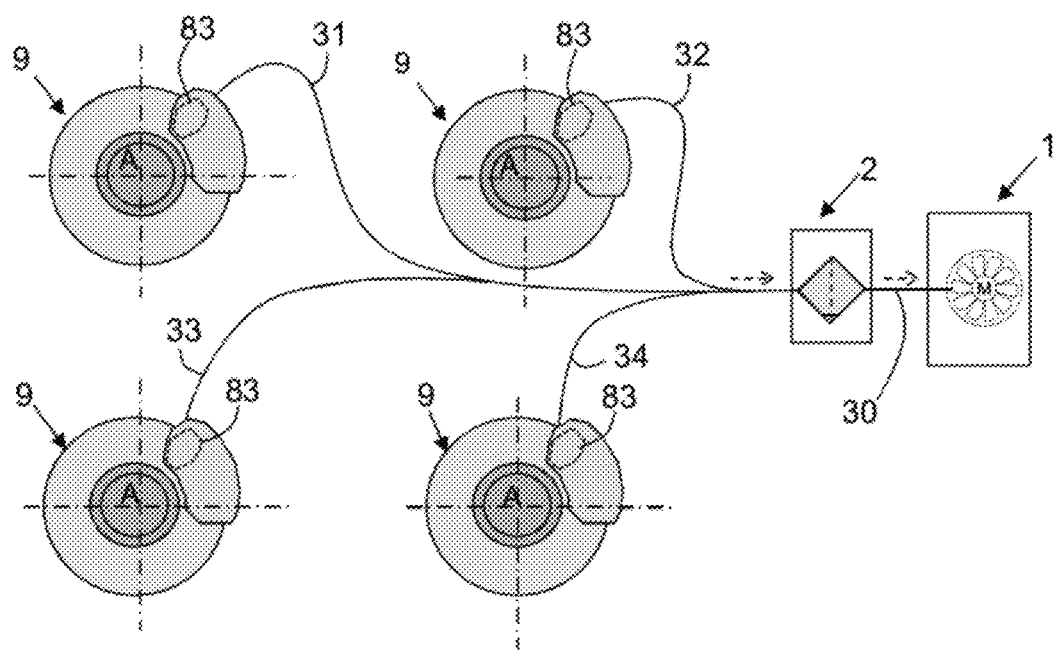
FIG. 3 shows a functional diagram of a centralized system for suctioning braking particles, on several wheels or axles.

The suction mouth (or the suction mouths as the case may be) is connected to a filter 2 by a fluid conduit that here is called the first conduit 3, as exemplified in FIG. 2. The first conduit 3 may be formed as piping without excluding a passage in the form of a tunnel through a part (for example the body of the caliper). The first conduit may be of greater or lesser length, this length ranging from a few tens of centimeters, for example 50 cm, to several meters in a centralized filtering configuration as illustrated in FIG. 3.

In general, the fluid connection between the suction mouth and the filter 2 may comprise one or more branches, T connections, Y connections, etc. The term pneumatic circuit can also be used to refer to the fluid conduits/air hose.

The fluid connection between the suction mouth and the filter 2 may comprise rigid portions and flexible hose portions.

Various configurations can be found between the suction mouths, the filter, and the negative-pressure source: there can be one filter for each suction mouth (maximally decentralized configuration), or even for each pair of suction mouths (FIG. 2), but it is also possible to have a single filter for a plurality of pairs of suction mouths (FIG. 3) (so-called centralized configuration), or even a single filter for the entire vehicle. This choice may be dictated by the type of vehicle, the service life required for the filter before clogging, the various constraints on installation within the vehicle, etc.

In the figures, a negative-pressure configuration is shown with the filter interposed between the first conduit 3 and the negative-pressure source 1 which suctions the particles through the filter which is then at a negative pressure relative to the external ambient pressure. However, in a configuration not shown, the negative-pressure source can be interposed between the first conduit and the filter, in which case the turbine sucks the particles in and then the turbine blows them into the filter (filter at positive pressure instead of at negative pressure).

In a typical embodiment, the filter 2 may comprise a filter medium, of paper or other type, allowing air to pass through and trapping the small particles contained in the stream coming from the suction mouths.

The term 'filter' is to be understood broadly here: this term comprises centrifugal filter solutions ('cyclone' type), filter solutions with an electromagnetic trapping technique, and filter solutions with an electrostatic trapping technique. The term 'filter' also includes a solution where the particles are directed towards an already existing filter such as the passenger compartment air filter or towards the filter of the catalytic converter.

The particle filter 2 is configured to filter air coming from the suction mouths which is carrying solid particles having micrometric or millimetric dimensions, in other words allowing air to pass through the filter medium while the particles do not pass through the filter medium and are trapped thereon.

In the example illustrated, the negative-pressure source 1 is formed by a suction turbine 10 driven by an electric motor 11.

In the example illustrated, the turbine with its electric motor forms a separate entity from the filter. Under these conditions, a second pneumatic fluid conduit 30 is provided to connect the turbine to the filter. Depending on the vehicle configurations and the centralized or non-centralized aspect of the solution, the length of the piping can be more or less long. The longer the piping, the greater the volume of air present in the piping and the longer the response time to obtain a desired negative pressure, which emphasizes the advantage of the solution presented below.

It should be noted that a configuration with the turbine and filter as a single entity is also possible; in this case there is no second pneumatic line.

The suction system further comprises a control unit 6 configured to drive the turbine. The turbine in question can be controlled to be on or off by the control unit, for example via a control relay.

The DC voltage used to power the motor may depend on the field of application of the system for suctioning particles, for example 12 volts in conventional motor vehicles, 24 volts in heavy-duty or industrial vehicles such as trucks or buses, or even 72 volts in rolling stock (tram, train).

According to one particular embodiment, the control unit 6 may be capable of generating a control signal to control the speed of the motor; provision may be made for the control logic to make use of a signal modulated by PWM (pulse width modulation).

It should be noted here that instead of a suction turbine, the negative-pressure source may be preexisting in the vehicle, in particular, for the case of the automotive sector, a negative-pressure source caused by operation of the vehicle's engine, for example a bypass from the air intake, or else for example by the use of a Venturi effect on an outflowing stream of gas, for example exhaust gases. In the case of the railway sector, the negative-pressure source may be derived from the pneumatic braking system or from some other auxiliary system of the railway vehicle in question.

In order to suction the braking particles resulting from abrasion, the interior of the first conduit 3 has a prevailing desired negative-pressure value.

Figure 4:
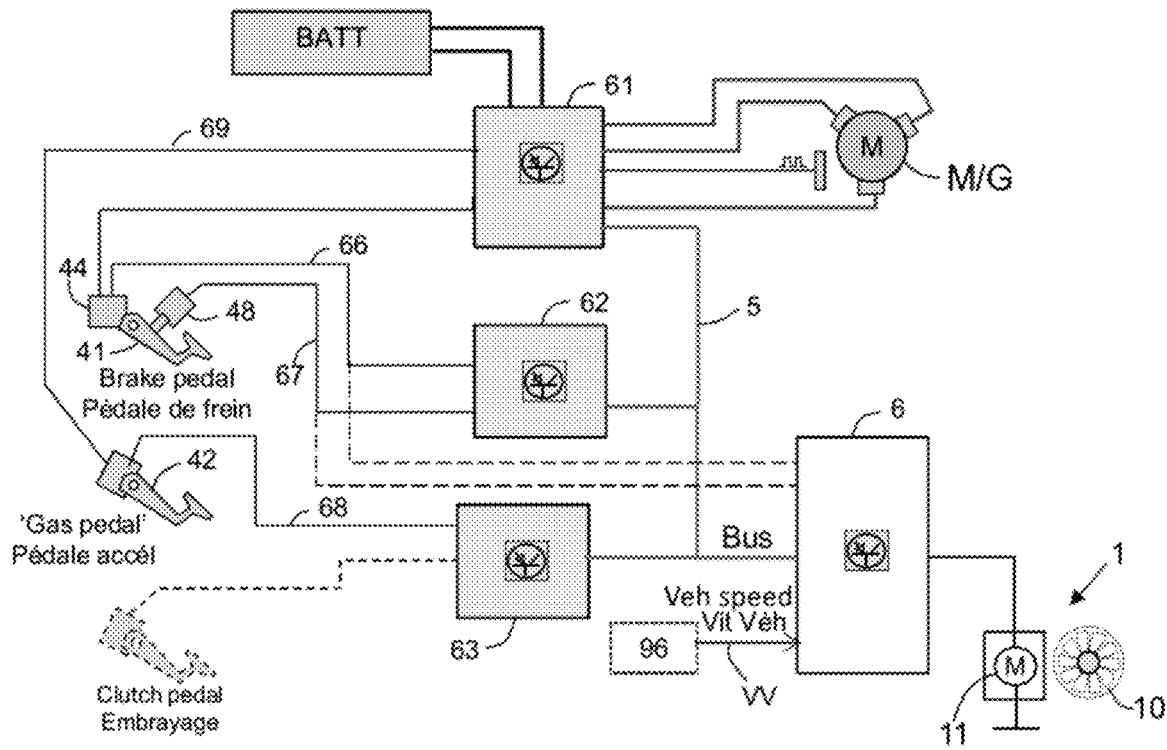
FIG. 4 shows a functional block diagram of a system for suctioning braking particles, in an automotive context.

As can be seen in FIG. 4, the control unit 6 receives information from other units present on board the vehicle.

First of all, in the context of a hybrid vehicle, the vehicle system comprises a drivetrain with an electric motor and a battery BATT and also a combustion engine. The battery is often a powerful battery BATT capable of driving the vehicle forward without intervention from the combustion engine (zero combustion emissions). In the context of a full electric vehicle, the powerful battery BATT is the only source of energy; there is no combustion engine.

There is therefore an electric machine denoted M/G. Such an electric machine is connected to the wheels of the vehicle in some manner, more or less directly. Such an electric machine may be controlled like an electric motor or may be controlled like an electric generator depending on the usage configurations.

The power of such an electric machine can range from 1 kW to 100 kilowatts, depending on whether it involves a microhybrid configuration (electric boost and braking, regenerative) for the low electric powers involved, or whether it involves a full hybrid configuration with a zero-emission combustion mode at low speeds (and of course regenerative braking) for moderate powers, and finally for the highest powers involving vehicle configurations dedicated to pure electric mode (where appropriate with a range extender).

It should be noted that in all of the above cases, the electric machine can be controlled like a generator in energy recovery mode, which corresponds to a regenerative braking phase. Therefore, it is legitimate to speak of a driving/braking drivetrain of the vehicle.

A control computer 61 is provided that controls the electric machine. To refer to the electric machine in question, one can also use the term "motor-generator" (M/G). The electric machine may be provided as an alternator-starter arranged as an attachment to the motor or as an attachment to the transmission.

Controlling the power or torque of the electric machine, either in motor mode or in generator mode, is known per se and is therefore not described in detail here. It is nevertheless restated that the computer that controls the electric machine is capable of providing information representative of activation of a regenerative braking mode in the electric machine. The use of this information will be described below. The term "electromagnetic braking" is also used to designate regenerative braking.

The system further comprises a brake pedal 41 intended to be actuated by a driver of the vehicle. In some configurations, there is simply a binary on/off switch 48 in interaction with the brake pedal 41. This switch may deliver information 67 directly to the control unit 6 of the suction system. In another embodiment, a switch 68 is connected to a control unit 62 for the braking function, for example the unit which manages the ABS function, and which will transmit one or more items of information via a multiplexed bus 5 to the suction control unit 6 (a wired connection is not excluded either).

According to another configuration, a greater wealth of information may be provided, analog or digital, precisely reflecting the current position of the brake pedal, which allows the control unit 6 to know the braking intensity as well as be able to act very early once the action of the user or the driver on the brake pedal begins. In this case, an analog or digital potentiometer 44 is provided, which delivers detailed information 66 to the control unit 6 of the suction system, directly (dotted line) or via the control unit 62 of the braking function.

According to another configuration, the braking actuator may be any other type of pedal or a manipulator depending on the type of stock or vehicles concerned (rail car, etc.).

In addition to the brake pedal, in the example illustrated in FIG. 4, there is provided an accelerator pedal 42 as is known per se. The accelerator pedal can deliver an analog or digital electrical signal representative of the current position of the pedal within the authorized path of the accelerator pedal. The information about the current position is delivered, in the context of a hybrid vehicle, both to a control computer 63 for the combustion engine and to the control computer 61 for the electric machine, via connections 69, 68. Of course, the accelerator pedal information could be delivered to a single computer which would propagate the information to the other computers via the multiplexed bus 5.

The control unit 6 is configured to take into account a rapid release of the foot from the accelerator pedal so as to anticipate an emergency braking phase in which friction braking must be applied as soon as possible.

The control unit 6 is configured to take into account the control signals controlling the fuel injectors of the combustion engine. Thus, a reduction in the control time of the injectors is another way that reflects a rapid release of the foot and therefore a substantial probability of subsequent braking, and preemptive activation of the system for suctioning braking particles is then activated.

The various computers involved 6, 61, 62, 63 can typically communicate with one another via a reliable and fast CAN type of multiplexed bus.

The control unit 6 also uses the current vehicle speed information VV. This may be delivered by a specific sensor or may be made available by one of the onboard computers 96.

Figure 5:
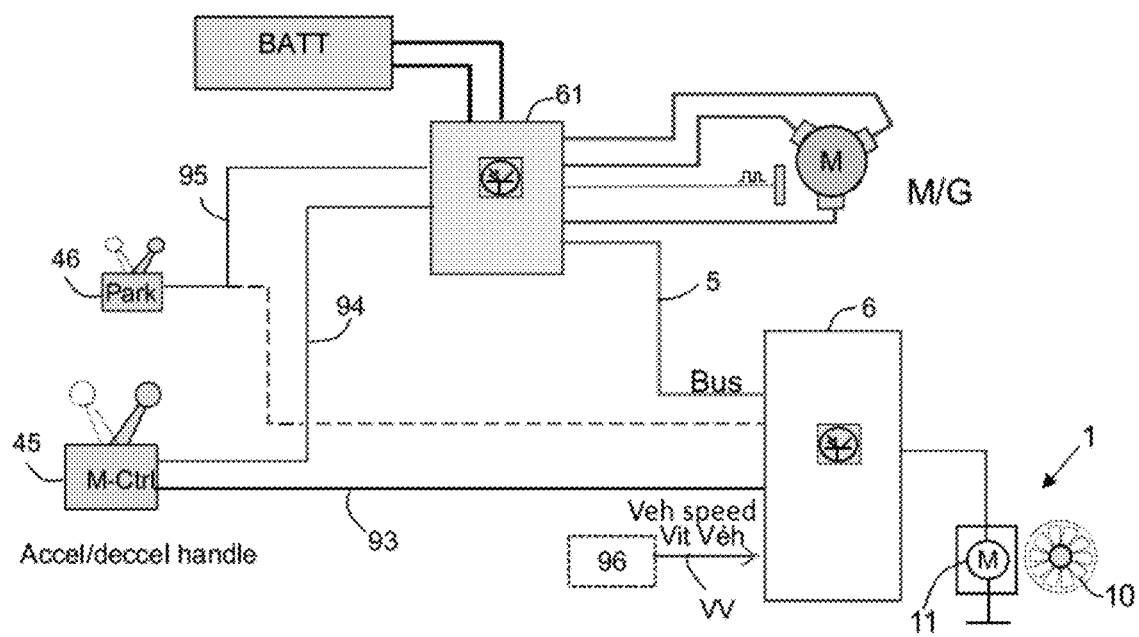
FIG. 5 shows a functional block diagram of the system for suctioning braking particles, in a context of rolling stock.

According to another configuration, in particular illustrated in FIG. 5, the system comprises a manipulator 45 which is used to control both acceleration and deceleration. This configuration is typical of rolling stock. The manipulator is connected to the drive-control computer 61 by connection 94, possibly multiplexed; the manipulator is connected to the suction control unit 6 by connection 93, multiplexed or not.

For example, when the driver pushes the handle 45 forward, this causes the electric machine (or electric machines) to be in driving mode (positive torque), with forward control, while conversely when the driver pulls the handle 45 backward, this causes negative-torque control, meaning generator mode to brake the vehicle.

The system may further include an auxiliary control actuator 46 for activating or releasing a parking brake. This parking brake can also be used as a service brake or emergency brake in certain configurations, via connection 95. If this is the case, a wired connection linking this actuator to the control unit 6 may be provided so that it is also taken into account in the control logic.

The other elements shown in FIG. 5 are identical or similar to those described for FIG. 4.

Figure 6:
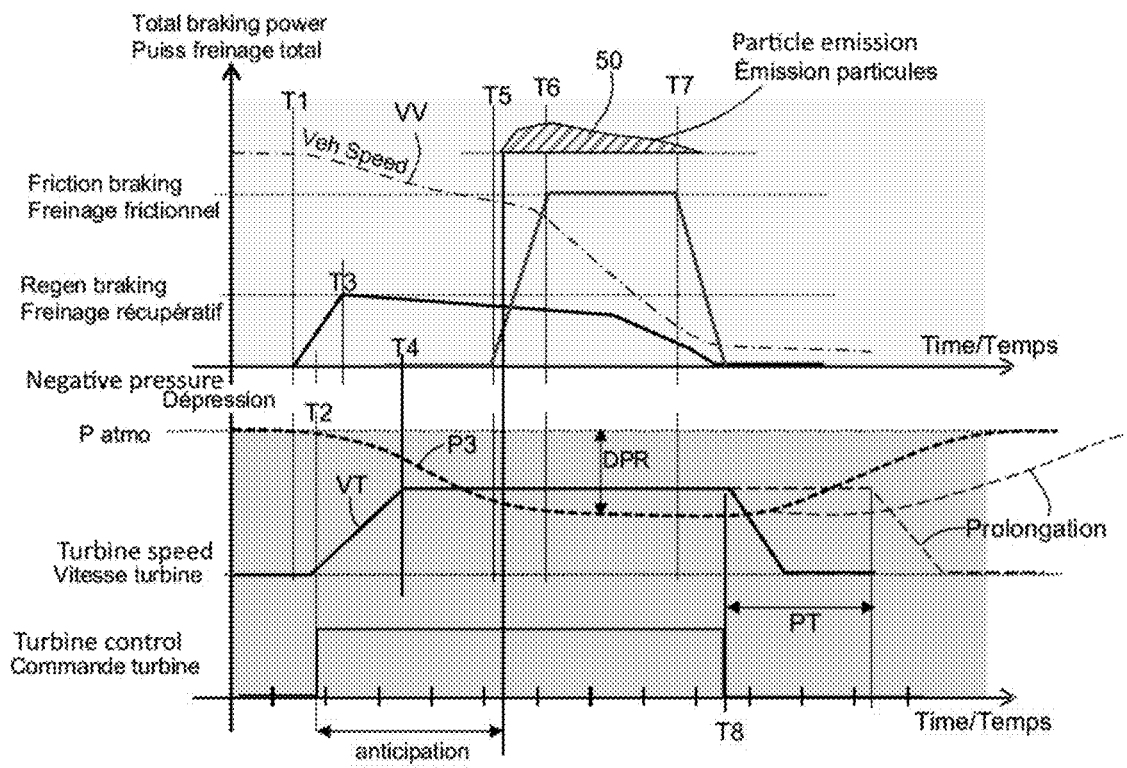
FIG. 6 shows timing diagrams illustrating at least one functionality of the system, FIG. 7 provides a physical illustration of the components of the system for suctioning braking particles.
Figure 7:
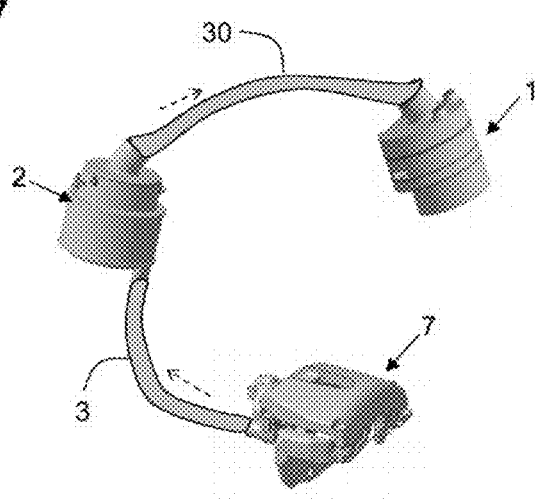

With the aid of a timing diagram, FIG. 6 illustrates an example of the operating logic and associated control method.

At time T1, the driver presses on the brake pedal (or respectively pulls the manipulator) which causes activation of a regenerative braking phase, in other words controlling the electric machine in generator mode. As this information is transmitted in real time to the control unit 6 of the suction means, control of the suction turbine is then applied at time T2. From this moment on, one will note that the pressure prevailing in the first conduit and suction mouth denoted P3 decreases (the curve deviates downwards from the atmospheric pressure). However, friction braking has not yet started at that time; this is how this logic can justifiably be called preemptive control of the suctioning. Time T3 corresponds to the peak electromagnetic braking.

At time T4, the turbine has reached its setpoint speed and the pressure P3 continues to decrease to reach a target negative-pressure level denoted DPR.

The predetermined negative-pressure setpoint DPR is selected within a range of 20 to 40 millibars below ambient pressure.

Time T5 corresponds to the start of the friction braking phase.

Time T6 corresponds to the moment when the friction braking reaches its nominal power.

The cross-hatched area labeled 50 is representative of the amount of particles released by abrasion between the pad and the rotating member.

Given that at time T5, the negative pressure has reached the target value DPR, the suction efficiency is at its maximum when particle emission begins.

Time T7 corresponds to when the brake pedal 41 begins to be released.

Time T8 corresponds to when control of the turbine is discontinued.

The curve denoted P3 represents the pressure prevailing inside the first conduit 3, in other words substantially the suction pressure applied at the suction mouth 83.

The curve illustrating the vehicle speed shows that the electromagnetic braking is all the more effective when the current speed is high; the curve also shows that friction braking produces a higher rate of deceleration than electromagnetic braking.

According to one possible option, an extension time (denoted PT) of the turbine activation command is provided beyond time T8 where braking has effectively ceased.

Expressed in another manner, the control unit 6 implements a method comprising at least the following actions:
  receiving one or more items of information from a control computer for a motor-generator of a driving/braking system of the vehicle,
  establishing conditions for preemptive control of the negative-pressure source, as a function of at least one electromagnetic braking signal,
  controlling the negative-pressure source according to the conditions for preemptive control.

The control logic may also involve other sources of information.

For example, the vehicle speed information VV may be used to avoid activating the suctioning system when the vehicle speed is zero or remains zero.

The control unit may also be configured to take into account information coming from an environment recognition system, which can comprise cameras, lidars, in particular those with obstacle detection functionality, in the context of driving assistance and autonomous driving systems.

According to another example, provision is made to extend the activation of the turbine after the actual braking phase, for a predetermined time which may either be fixed or a parameter linked to a calibration (extended time PT fixed or resulting from calibration).

According to another example, the control unit is further configured to take into account a map containing areas with a high probability of braking, and/or long downhill areas, for example a mountain pass road taken downhill.

According to another example, the control unit is further configured to take into account a stream of information from an electrodynamic braking computer responsible for controlling an electrodynamic type of auxiliary braking system, for example a retarder, which is a system frequently found in heavy-duty vehicles.

To illustrate the orders of magnitude, the power consumed by the turbine 10 and its electric motor 11 can range from around thirty watts to more than one kilowatt; in practice, this power may be comprised within a range of [30 W-800 W] depending on the number of suction mouths to be served and also depending on the length of the piping, which generate a slight pressure drop.

In one configuration, the speed of the turbine can range from 0 to 12,000 rpm.

In one configuration, the speed of the turbine can range from 0 to 30,000 rpm.

The response time of the turbine in order to go from zero to the setpoint speed can typically be between 100 ms and 700 ms, most often between 400 ms and 600 ms for automotive applications.

In FIG. 3, we find a centralized filter, a centralized pressure sensor, and pipes or hoses 31, 32, 33, 34 which make it possible to connect each of the suction mouths 83 to the filter 2.

Note that there may be several filters served by the same turbine.

Note that the ploy of preemptive control can also be applied to stationary machines such as wind turbines or industrial machines, to brake a rotor based on control information that precedes the actual application of friction braking. This preemptive information can be obtained from a control computer for an electric machine controlling the rotor in motor mode or generator mode.

The invention claimed is:

1. System for suctioning braking particles from a friction braking system of a vehicle, in a hybrid or electric vehicle, the suction system comprising: at least one negative-pressure source (1), at least one suction mouth (83) connected by a pneumatic circuit (3, 30) to the negative-pressure source, and a control unit (6) configured to control the negative-pressure source,
   wherein the suction system further comprises a stream of information originating from a computer (61) that controls a motor-generator of a driving/braking system of the vehicle,
   and wherein the control unit is configured to control the negative-pressure source preemptively before the actual activation of the friction braking, the control unit controlling the negative-pressure source at least as a function of the activation of electromagnetic braking.

2. The system according to claim 1, further comprising at least one filter (2) to collect the suctioned particles.

3. The system according to claim 2, wherein the pneumatic circuit comprises a first conduit (3) connecting the suction mouth to the filter, the filter (2) interposed between the first conduit (3) and the negative-pressure source (1).

4. The system according to claim 1, wherein the negative-pressure source is formed by a turbine (10) driven by an electric motor (11).

5. The system according to claim 1, wherein the suction system further comprises a stream of information originating from an electrodynamic braking computer, and the control unit is configured to control the negative-pressure source according to activation of an electrodynamic braking.

6. The system according to claim 1, wherein there is provided at least a second conduit (30) connecting the filter to the negative-pressure source.

7. Method for controlling a system for suctioning friction braking particles from a braking system of a vehicle, the suction system comprising:
   at least one negative-pressure source, at least one suction mouth (83), at least one pneumatic circuit (3, 30) connecting the suction mouth to the negative-pressure source, and a control unit (6) configured to implement the steps of:
   receiving one or more items of information from a computer that controls a motor-generator of a driving/braking system of the vehicle,
   establishing conditions for preemptive control of the negative-pressure source, as a function of at least one electromagnetic braking signal,
   controlling the negative-pressure source according to the conditions for preemptive control.

8. The method according to claim 7, wherein the control unit is further configured to receive one or more items of information from a friction braking control system of the vehicle.

9. The method according to claim 7, wherein the control unit is further configured to take into account a rapid release of the foot from the accelerator pedal.

10. The method according to claim 7, wherein the control unit is further configured to receive information on the current speed of the vehicle, so as to be able to reduce or discontinue the controlling of the turbine in the event that the vehicle is at zero speed.

11. The method according to claim 7, wherein the control unit is further configured to extend the activation of the suction system by a predetermined time after one of the following events: release of the friction brake or stopping of the vehicle speed (zero speed maintained).

12. The method according to claim 7, wherein the control unit is further configured to take into account a map containing areas with a high probability of braking, and/or areas of long descent.

13. The system according to claim 1, wherein there is provided at least a second conduit (30) connecting the filter to the negative-pressure source, in a centralized configuration.

14. The system according to claim 13, wherein the centralized configuration is a filter and a turbine being connected to at least four suction mouths.

15. The method according to claim 8, wherein the control unit is further configured to take into account a rapid release of the foot from the accelerator pedal.

16. The method according to claim 8, wherein the control unit is further configured to receive information on the current speed of the vehicle, so as to be able to reduce or discontinue the controlling of the turbine in the event that the vehicle is at zero speed.

17. The method according to claim 9, wherein the control unit is further configured to receive information on the current speed of the vehicle, so as to be able to reduce or discontinue the controlling of the turbine in the event that the vehicle is at zero speed.

18. The method according to claim 8, wherein the control unit is further configured to extend the activation of the suction system by a predetermined time after one of the following events: release of the friction brake or stopping of the vehicle speed (zero speed maintained).

19. The method according to claim 9, wherein the control unit is further configured to extend the activation of the suction system by a predetermined time after one of the following events: release of the friction brake or stopping of the vehicle speed (zero speed maintained).

20. The method according to claim 10, wherein the control unit is further configured to extend the activation of the suction system by a predetermined time after one of the following events: release of the friction brake or stopping of the vehicle speed (zero speed maintained).

* * * * *